United States Patent [19]
Hirachi

[11] Patent Number: 5,384,792
[45] Date of Patent: Jan. 24, 1995

[54] UNINTERRUPTIBLE POWER SUPPLY

[75] Inventor: Katsuya Hirachi, Takatsuki, Japan

[73] Assignee: Yuasa Battery Co., Ltd., Osaka, Japan

[21] Appl. No.: 276,485

[22] Filed: Jul. 18, 1994

Related U.S. Application Data

[63] Continuation of Ser. No. 169,549, Dec. 20, 1993, abandoned, which is a continuation of Ser. No. 881,210, May 11, 1992, abandoned.

[30] Foreign Application Priority Data

May 14, 1991 [JP] Japan .................. 3-139689

[51] Int. Cl.$^6$ .................. G06F 11/00; H03M 13/00
[52] U.S. Cl. .................. 371/66; 307/64
[58] Field of Search .............. 371/66; 363/37; 307/66, 307/64, 85, 87

[56] References Cited

U.S. PATENT DOCUMENTS

| | | | |
|---|---|---|---|
| 4,313,060 | 1/1982 | Fickenscher et al. | 307/23 |
| 4,673,825 | 6/1987 | Raddi et al. | 307/66 |
| 4,707,618 | 11/1987 | Hass | 307/64 |
| 4,719,550 | 6/1988 | Powell et al. | 363/37 |
| 4,782,241 | 11/1988 | Baker | 307/66 |
| 4,827,150 | 5/1989 | Reynal | 307/66 |
| 4,868,832 | 9/1989 | Marrington et al. | 371/66 |
| 5,045,989 | 9/1991 | Higaki et al. | |

Primary Examiner—Charles E. Atkinson
Assistant Examiner—Joseph E. Palys
Attorney, Agent, or Firm—Watson, Cole, Grindle & Watson

[57] ABSTRACT

An uninterruptible power supply which is down-sized and lightened is provided. A utility line 1 is connected with a switch 8 and the switch 8 is connected with a rectifying circuit 2 and DC power from the rectifying circuit 2 inputs to a first inverter 3-1 and charges a battery 6 by a charger 7 connected with a node between the utility line 1 and the switch 8 and the DC power from the battery 6 is converted to AC power by a second inverter 3-2 to input to the rectifying circuit 2. When the utility line 1 is interrupted, AC power from the second inverter 3-2 is supplied to the rectifying circuit 2 to continuously supply power to a load 4. As a result, the number of cells in a battery may be reduced, the cost and man-day of the unit may be reduced, the reliability of the unit may be improved and the supply may be down-sized and lightened.

4 Claims, 2 Drawing Sheets

UNINTERRUPTIBLE POWER SUPPLY

This application is a file wrapper continuation of application Ser. No. 08/169,549, filed Dec. 20, 1993, now abandoned, which in turn is a file wrapper continuation of application Ser. No. 07/881,210, filed May 11, 1992, also abandoned.

BACKGROUND OF THE INVENTION

1. Field of the Invention

The present invention relates to an uninterruptible power supply and more particularly to down-sizing and lightening weight of an uninterruptible power supply used as a backup power supply of computers and communication equipment.

2. Description of the Related Art

As shown by block diagrams in FIGS. 3 and 4, an uninterruptible power supply normally supplies AC power from a utility line 1 to a load 4 such as a computer and a communication equipment directly through a direct transmission line 10 or through a rectifying circuit 2 and an inverter 3 and when the utility line is interrupted, supplies DC power from a battery 6 to the load 4 by converting to AC power by the inverter 3 to prevent a trouble of the load 4 caused by the interruption.

The battery 6 in the uninterruptible power supply in FIG. 3 is arranged so that AC power from the utility line 1 is normally converted to DC power by the rectifying circuit 2 and the battery 6 is fully float-charged by the DC power and so that the DC power in the battery 6 is supplied to the inverter 3 when the utility line is interrupted.

On the other hand, a battery 6 in the uninterruptible power supply in FIG. 4 is arranged so that AC power from the utility line 1 is normally supplied to a charger 7 for fully charging the battery 6 and so that a switch 5 is turned on to supply DC power from the battery 6 to the inverter 3 when the utility line is interrupted.

Although the arrangement of the uninterruptible power supply in FIG. 3 may be simplified since the battery 6 is charged by output of the rectifying circuit 2, the output voltage of the rectifying circuit 2 has to adjust the floating charge voltage of the battery 6, so that its accuracy needs to be improved.

On the other hand, although the arrangement of the uninterruptible power supply in FIG. 4 is more complicated than that in FIG. 3, the output voltage of the rectifying circuit 2 may be of the input condition of the inverter 3, so that only the accuracy of the output voltage of the charger 7 needs to be improved.

By the way, the inverter 3 in the uninterruptible power supply as described above is provided with a dead time for preventing its arm from short-circuiting via its switching elements. The switching elements also have forward voltage drops during their ON time. Accordingly, in order to obtain AC 100 V sine wave voltage from the inverter 3, its DC input voltage has to be at least 170 V and the final discharge voltage of the battery 6 also has to be more than 170 V. This means that when a lead-acid battery is used for the battery 6, it needs more than 100 cells.

In order to deal with that, it is tried that a boost-chopper circuit is inserted between the rectifying circuit 2 and the inverter 3, for lowering the output voltage of the rectifying circuit 2, increasing the DC input voltage to the inverter 3 and reducing the number of cells in the battery 6.

Accordingly, such uninterruptible power supply as described above had a disadvantage that the cost of the battery 6 accounts for a large amount in the total cost of the supply due to the large number of cells in the battery 6.

Moreover, since many cells are connected in series in the battery 6, there has been a problem in its reliability and man-day.

Furthermore, although the number of cells in the battery 6 may be reduced by inserting the boost-chopper circuit, such another problems caused by the boost-chopper circuit which is operated in high frequency that the efficiency is lowered, the number of parts is increased, the cost is increased and the reliability is decreased have brought about.

SUMMARY OF THE INVENTION

Accordingly, it is an object of the present invention to solve the aforementioned problems by providing an uninterruptible power supply which allows to reduce the number of cells in a battery, to reduce its cost and man-day, to improve its reliability and to down-size and lighten its weight.

In order to achieve the foregoing object, the uninterruptible power supply of the present invention is comprised of a rectifying circuit to which AC power from a utility line is inputted through a switch and which outputs DC power, a first inverter for converting the DC power from the rectifying circuit to AC power, a charger to which AC power from the utility line is inputted and which outputs power for charging a battery, the battery which is charged by the power, and a second inverter for converting DC power from the battery to AC power. Then, when the utility line is interrupted, the AC power from the second inverter is inputted to the rectifying circuit to supply power to a load continuously.

Accordingly, the battery in the present invention is charged by the power from the charger while AC power from utility line is supplied, and its DC power is converted by the second inverter to AC power and inputted to the rectifying circuit when the utility line is interrupted, so that the input voltage to the second inverter may be enough to output AC 100 V since wave through the second inverter, the rectifying circuit and the first inverter and the number of cells in the battery may be reduced.

Moreover, the second inverter needs not be operated in high frequency, so that such problems that the efficiency is lowered and the cost is increased due to the second inverter are eliminated.

The specific nature of the invention, as well as other objects, uses and advantages thereof, will clearly appear from the description and from the accompanying drawings.

DETAILED DESCRIPTION OF PREFERRED EMBODIMENT

Figure 1:
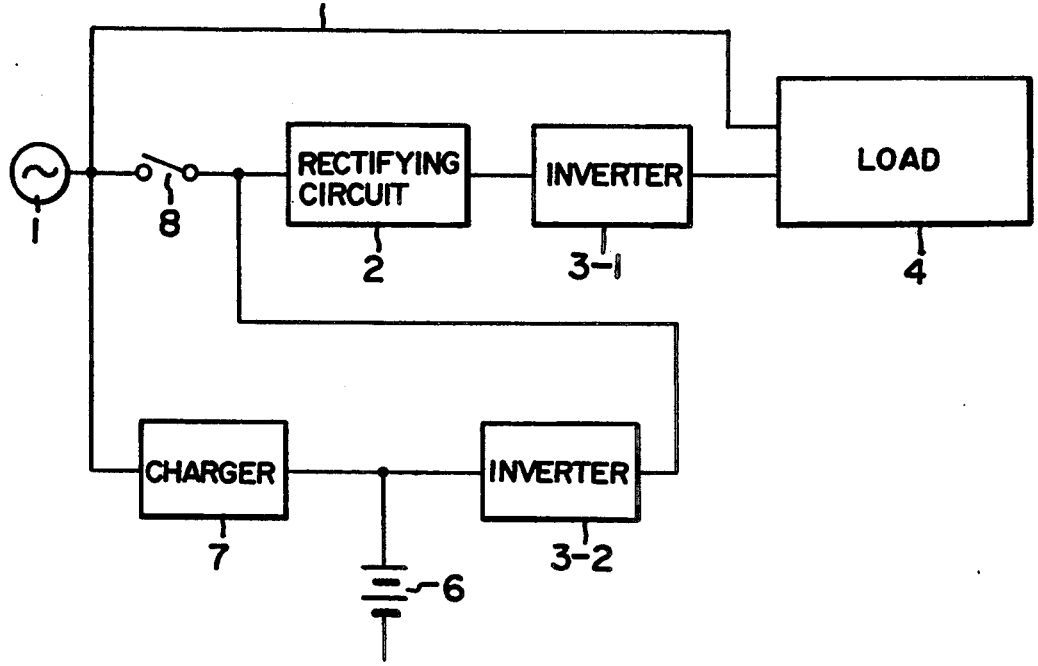
FIG. 1 is a block diagram illustrating an uninterruptible power supply of the present invention.
Figure 2:
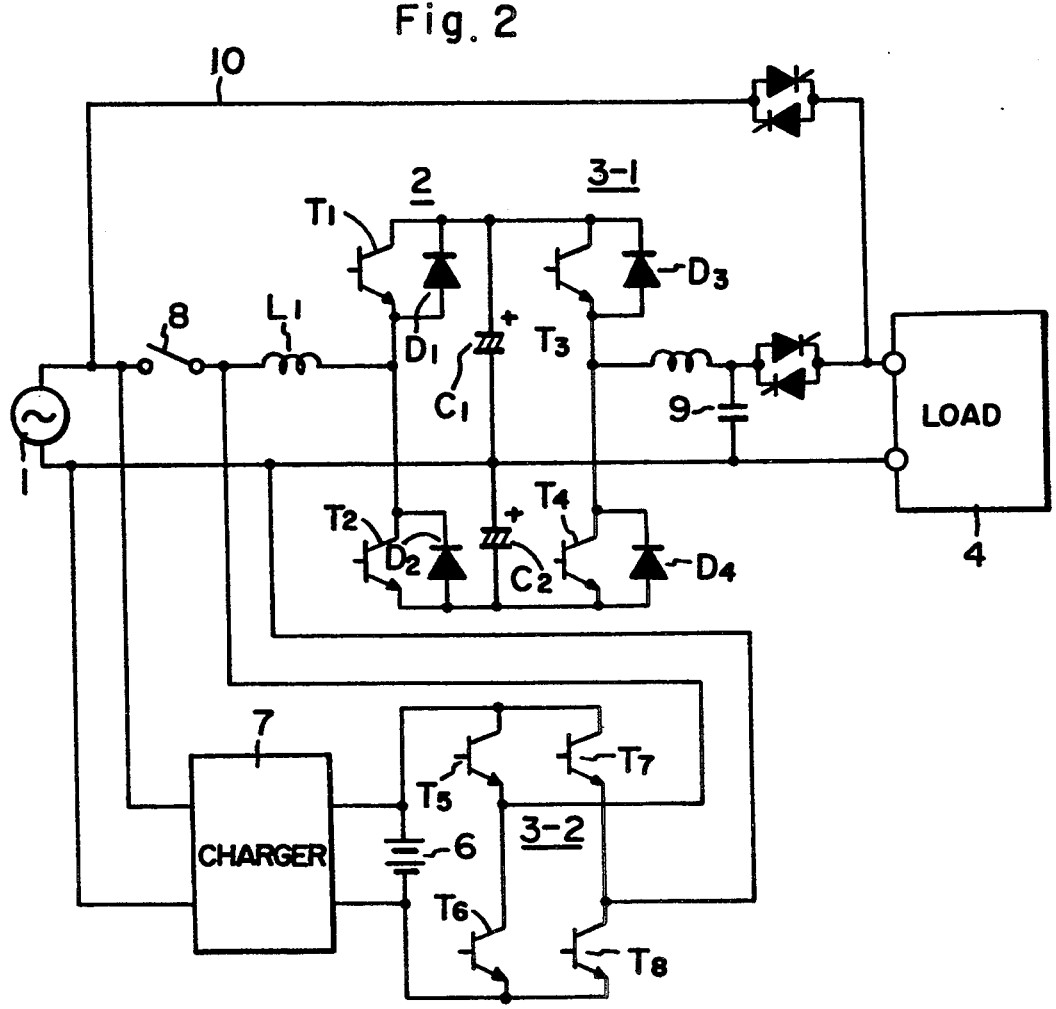
FIG. 2 is a circuit diagram of the uninterruptible power supply of the present invention.
Figure 3:
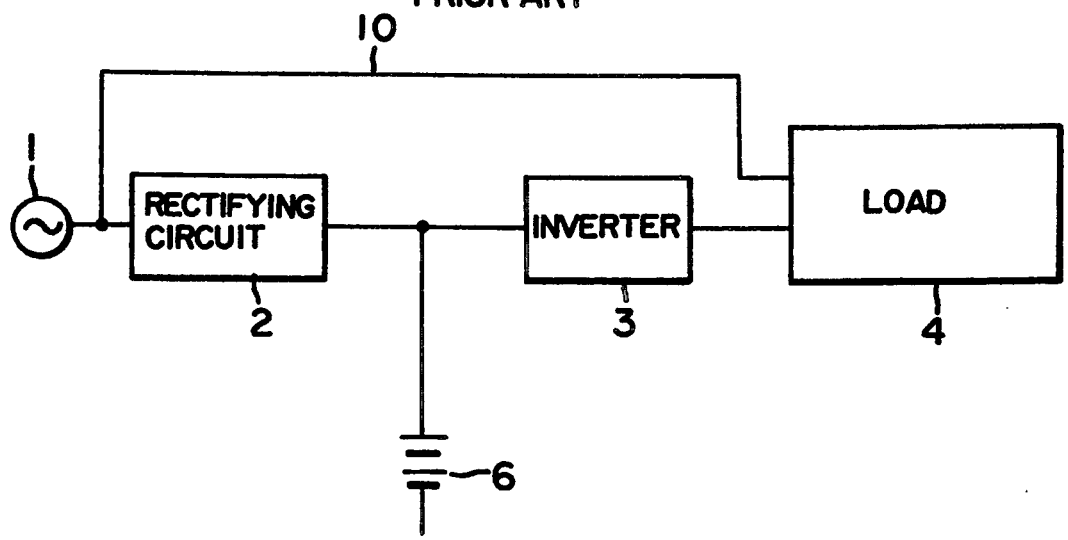
FIG. 3 is a block diagram illustrating a conventional uninterruptible power supply.
Figure 4:
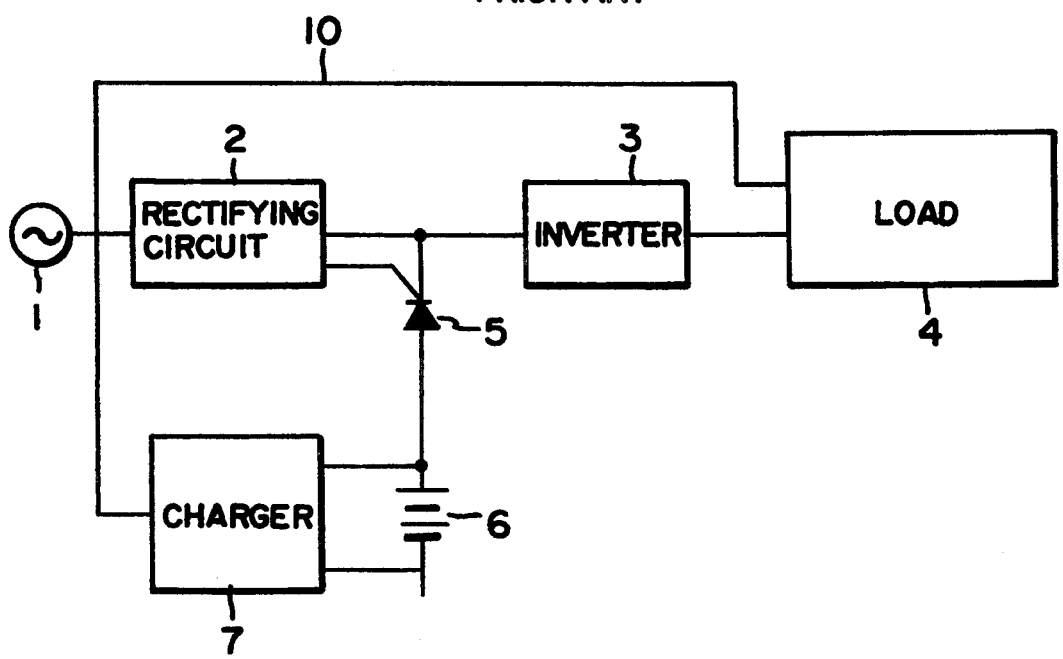
FIG. 4 is a block diagram illustrating another conventional uninterruptible power supply.

FIG. 1 is a block diagram illustrating an uninterruptible power supply of the present invention and FIG. 2 is a circuit diagram of the uninterruptible power supply of the present invention. The parts having the same functions with those in FIGS. 3 and 4 are denoted by the same reference numerals and explanation thereof is omitted here.

Features of the arrangement of the present invention Lie in that a utility line 1 is connected with a switch 8 and the switch 8 is connected with a rectifying circuit 2 and that DC power from the rectifying circuit 2 inputs to a first inverter 3-1 and charges a battery 6 by a charger 7 connected with a node between the utility line 1 and the switch 8 and that DC power from the battery is converted to AC power by a second inverter 3-2 to input to the rectifying circuit 2.

While AC power from the utility line 1 is supplied, the AC power is inputted to a load 4 by turning the switch 8 on and through the rectifying circuit 2 and the first inverter 3-1 or by a direct transmission line 10 and the battery 6 is charged by the charger 7. By the way, it may be needless to say that the operation of the second inverter 3-2 is stopped during this time to prevent unnecessary discharge of the battery 6.

When the utility line 1 is interrupted, the second inverter 3-2 starts its operation, its AC power is inputted to the rectifying circuit 2 to convert to DC power and the DC power is converted to AC power by the first inverter 3-1 and continuously supplied to the load 4. The power of the battery 6 may be effectively utilized during the interruption by turning off the switch 8 not to supply the AC power from the second inverter 3-2 backwardly to the utility line 1 and the direct transmission line 10.

Referring now to FIG. 2, one embodiment of the uninterruptible power supply of the present invention will be explained.

In FIG. 2, the rectifying circuit 2 is comprised of switching elements T1 and T2 connected in series and diodes D1 and D2 connected with each element in anti-parallel, the first inverter 3-1 is comprised of switching elements T3 and T4 connected in series and diodes D3 and D4 connected with each element in anti-parallel and the second inverter 3-2 is comprised of two sets of switching elements T5, T6 and T7, T8 respectively connected in series. A choke coil L1 is inserted between the switch 8 and the rectifying circuit 2, capacitors C1 and C2 connected in series are inserted between the rectifying circuit 2 and the first inverter 3-1 and a filter circuit 9 is inserted between the first inverter 3-1 and the load 4.

While AC power from the utility line 1 is supplied, the switching element T2 is turned on and the current from the utility line 1 flows through the choke coil L1, the switching element T2, the capacitor C2 during its positive half cycle. Sum of the voltage of the utility line 1 and that of the capacitor C2 is applied to the choke coil L1 and the current gradually increases, storing energy in the choke coil L1. Then when the switching element T2 is turned off, the energy stored in the choke coil L1 is transferred to the capacitor C1 from the choke coil L1 through the diode D1, the capacitor C1 and the utility line 1. Since the voltage of the capacitor C1 is applied to the choke coil L1, its current gradually decreases. In this half cycle, the switching element T1 is turned off and only the switching element T2 repeats the aforementioned operations in high frequency.

While AC power from the utility line 1 is supplied, the switching element T1 is turned on and the current from the utility line 1 flows through the capacitor C1, the switching element T1, the choke coil L1 during its negative half cycle. Sum of the voltage of the utility line 1 and that of the capacitor C1 is applied to the choke coil L1 and the current gradually increases, storing energy in the choke coil L1. Then when the switching element T1 is turned off, the energy stored in the choke coil L1 is transferred to the capacitor C2 from the choke coil L1 through the utility line 1, the capacitor C2 and the diode D2. Since the voltage of the capacitor C2 is applied to the choke coil L1, its current gradually decreases. In this half cycle, the switching element T2 is turned off and only the switching element T1 repeats the aforementioned operations in high frequency.

Accordingly, by controlling ON and OFF ratio of the switching elements T2 and T1 in each positive and negative cycle, waveform of AC input current may be turned into sine wave by the rectifying circuit 2 and the power factor may rise. Moreover, its DC output voltage may be controlled to be constant voltage by controlling amplitude of the AC input current.

The DC power thus obtained is supplied to the first inverter 3-1 and its sine wave output may be supplied to the load 4. The positive half cycle output is obtained by turning the switching element T3 on and off in high frequency having pulse width that corresponds to the amplitude of the sine wave output and the negative half cycle output is obtained by turning the switching element T4 in high frequency having pulse width that corresponds to the amplitude of the sine wave output.

While AC power from the utility line 1 is supplied, the battery 6 is charged by the charger 7, but the operation of the second inverter 3-2 is stopped to prevent the battery 6 from discharging unnecessarily.

On the other hand, when the utility line 1 is interrupted, the switch 8 is turned off and the second inverter 3-2 starts its operation. The second inverter 3-2 derives rectangular wave output of commercial frequency and the output of the positive half cycle derives by turning the switching elements T5 and T8 on continuously and the output of the negative half cycle derives by turning the switching elements T6 and T7 on continuously.

Accordingly, the waveform of the AC voltage supplied to the rectifying circuit 2 during the utility line is interrupted is changed from sine wave to rectangular wave and the input current also changes from sine wave to rectangular wave, but the rectifying circuit 2 and the first inverter 3-1 operate in the same way. At this time, the voltage of the rectangular wave becomes equal to the voltage of the battery 6, but since the rectifying circuit 2 has a boosting effect, AC 100 V sine wave voltage may be obtained from the first inverter 3-1 without raising its input voltage. This means that the number of cells in the battery 6 may be reduced.

Moreover, since the second inverter 3-2 derives rectangular output of the commercial frequency, the switching elements T5, T6, T7 and T8 may be of what having low switching speed and therefore, the cost may be reduced and the efficiency of the supply will not be lowered due to switching loss.

As described above, according to the present invention, the number of cells in the battery 6 may be reduced, so that the cost of the battery 6 may be reduced and it is advantageous in terms of the man-day and the reliability of the supply.

Furthermore, since the number of cells of the battery 6 may be reduced according to the present invention, the supply may be down-sized and its weight may be lightened.

Still more, since the second inverter 3-2 is operated by commercial frequency, the cost will not be increased due to parts to be used and almost no decrease of the efficiency of the supply will be brought about due to the second inverter 3-2.

While the described embodiment represents the preferred form of the present invention, it is to be understood that modifications will occur to those skilled in the art without departing from the spirit of the invention. The scope of the invention is therefore to be determined solely by the appended claims.

What is claimed is:

1. An uninterruptible power supply for providing power to a load from an AC power source, comprising:
    a circuit for rectifying the power from said AC source to generate DC power output having an AC ripple component and operating at a higher frequency than said AC power source;
    a switch connecting and disconnecting said AC power source and the rectifying circuit;
    a first inverter circuit connected between the DC power output of the rectifying circuit and the load to provide an AC power output thereto, and said AC power output having the same frequency as the AC ripple component of said dc power output of the rectifying circuit;
    a battery for providing back-up power to the power supply;
    means for charging said battery and connected to said AC power source; and
    a second inverter connected to said battery and providing an AC output having the same frequency as said AC power source and connected to the rectifying circuit with said switch disconnecting said AC power source and the rectifying circuit, whereby AC power is supplied continuously to the load.

2. The power supply as claimed in claim 1, wherein the rectifying circuit includes serially-connected first and second switching elements, each said first and second switching element further including a diode connected anti-parallelly therewith, and said switch is connected to the common node of said first and second switching elements.

3. The power supply as claimed in claim 1, wherein said first inverter includes serially-connected third and fourth switching elements, each said switching element further including a diode connected anti-parallelly therewith, said serially-connected third and fourth switching elements being connected in parallel across said first and second serially-connected switching elements.

4. The power supply as claimed in claim 1, wherein said second inverter includes fifth and sixth serially-connected switching elements, seventh and eighth serially-connected switching elements, said serially-connected fifth and sixth switching elements and said serially-connected seventh and eighth switching elements being connected in parallel, and said battery being connected in parallel across the parallelly-connected switching elements.

* * * * *